United States Patent
Borst et al.

(10) Patent No.: US 11,358,059 B2
(45) Date of Patent: Jun. 14, 2022

(54) LIVE TOY SYSTEM

(71) Applicant: GANZ, Woodbridge (CA)

(72) Inventors: Karl Borst, Toronto (CA); Howard Ganz, North York (CA)

(73) Assignee: GANZ, Woodbridge (CA)

( * ) Notice: Subject to any disclaimer, the term of this patent is extended or adjusted under 35 U.S.C. 154(b) by 50 days.

(21) Appl. No.: 16/884,984

(22) Filed: May 27, 2020

(65) Prior Publication Data

US 2021/0370182 A1    Dec. 2, 2021

(51) Int. Cl.
| | |
|---|---|
| *A63F 13/65* | (2014.01) |
| *A63H 3/28* | (2006.01) |
| *A63H 3/00* | (2006.01) |
| *A63F 13/42* | (2014.01) |
| *A63F 13/35* | (2014.01) |

(52) U.S. Cl.
CPC .............. *A63F 13/65* (2014.09); *A63F 13/35* (2014.09); *A63F 13/42* (2014.09); *A63H 3/003* (2013.01); *A63H 3/28* (2013.01); *A63F 2300/406* (2013.01); *A63F 2300/69* (2013.01); *A63F 2300/8094* (2013.01); *A63H 2200/00* (2013.01)

(58) Field of Classification Search
None
See application file for complete search history.

(56) References Cited

U.S. PATENT DOCUMENTS

| | | |
|---|---|---|
| 4,738,451 A | 4/1988 | Logg |
| 5,255,834 A | 10/1993 | Bendersky |
| 5,375,195 A | 12/1994 | Johnston |
| 5,411,259 A | 5/1995 | Pearson |
| 5,544,320 A | 8/1996 | Konrad |
| 5,572,646 A | 11/1996 | Kawai et al. |
| 5,606,652 A | 2/1997 | Silverbrook |
| 5,659,692 A | 8/1997 | Poggio et al. |

(Continued)

FOREIGN PATENT DOCUMENTS

| | | |
|---|---|---|
| CA | 2 475 463 A1 | 8/2003 |
| DE | 103 04 779 A1 | 9/2003 |

(Continued)

OTHER PUBLICATIONS

CNET News, "Who Let the Neopets out?," dated Feb. 26, 2002.
(Continued)

*Primary Examiner* — Jason T Yen
(74) *Attorney, Agent, or Firm* — Pearne & Gordon LLP

(57) ABSTRACT

The live toy system as described affords a user with an experience of interacting with a physical toy as if it were a live toy by communicating and interacting with the toy and its game version (avatar) via a game application. Unlike other products, the system provides a near identical or virtual representation of the physical toy in the online application. The online application provides a virtual world and/or game environment in which the game avatar exists and participates in part by input received from the user. Some of this input is provided to the physical toy from the user who can affect the appearance or behavior of the game avatar. The user can play and interact with both their physical toy in the real world and its game avatar in an online world—which provides an experience of a single live toy for the user.

22 Claims, 5 Drawing Sheets

(56) References Cited

U.S. PATENT DOCUMENTS

| | | |
|---|---|---|
| 5,682,469 A | 10/1997 | Linnett et al. |
| 5,684,943 A | 11/1997 | Abraham |
| 5,717,869 A | 2/1998 | Moran et al. |
| 5,736,982 A | 4/1998 | Suzuki et al. |
| 5,802,296 A | 9/1998 | Morse et al. |
| 5,822,428 A | 10/1998 | Gardner |
| 5,853,327 A | 12/1998 | Gilboa |
| 5,880,731 A | 3/1999 | Liles et al. |
| 5,886,697 A | 3/1999 | Naughton et al. |
| 5,890,963 A | 4/1999 | Yen |
| 5,923,330 A | 7/1999 | Tarlton |
| 5,926,179 A | 7/1999 | Matsuda et al. |
| 5,956,038 A | 9/1999 | Rekimoto |
| 5,959,281 A | 9/1999 | Domiteaux |
| 5,964,660 A | 10/1999 | James et al. |
| 5,966,526 A | 10/1999 | Yokoi |
| 6,009,458 A | 12/1999 | Hawkins et al. |
| 6,012,961 A | 1/2000 | Sharpe, III et al. |
| 6,031,549 A | 2/2000 | Hayes-Roth |
| 6,049,778 A | 4/2000 | Walker et al. |
| 6,057,856 A | 5/2000 | Miyashita et al. |
| 6,072,466 A | 6/2000 | Shah et al. |
| 6,081,830 A | 6/2000 | Schindler |
| 6,159,101 A | 12/2000 | Simpson |
| 6,173,267 B1 | 1/2001 | Cairns |
| 6,175,857 B1 | 1/2001 | Hachiya et al. |
| 6,200,216 B1 | 3/2001 | Peppel |
| 6,210,272 B1 | 4/2001 | Brown |
| 6,213,871 B1 | 4/2001 | Yokoi |
| 6,219,045 B1 | 4/2001 | Leahy et al. |
| 6,227,931 B1 | 5/2001 | Shackelford |
| 6,227,966 B1 | 5/2001 | Yokoi |
| 6,229,904 B1 | 5/2001 | Huang et al. |
| 6,251,010 B1 | 6/2001 | Tajiri et al. |
| 6,251,012 B1 | 6/2001 | Horigami et al. |
| 6,251,017 B1 | 6/2001 | Leason et al. |
| 6,253,167 B1 | 6/2001 | Matsuda et al. |
| 6,254,477 B1 | 7/2001 | Sasaki et al. |
| 6,256,043 B1 | 7/2001 | Aho et al. |
| 6,267,672 B1 | 7/2001 | Vance |
| 6,268,872 B1 | 7/2001 | Matsuda et al. |
| 6,273,815 B1 | 8/2001 | Stuckman |
| 6,290,565 B1 | 9/2001 | Galyean, III et al. |
| 6,290,566 B1 | 9/2001 | Gabai et al. |
| 6,311,195 B1 | 10/2001 | Hachiya et al. |
| 6,349,301 B1 | 2/2002 | Mitchell et al. |
| 6,352,478 B1 | 3/2002 | Gabai et al. |
| 6,356,867 B1 | 3/2002 | Gabai et al. |
| 6,368,177 B1 | 4/2002 | Gabai et al. |
| 6,388,665 B1 | 5/2002 | Linnett et al. |
| 6,394,872 B1 | 5/2002 | Watanabe |
| 6,404,438 B1 | 6/2002 | Hatlelid et al. |
| 6,406,370 B1 | 6/2002 | Kumagai |
| 6,449,518 B1 | 9/2002 | Yokoo et al. |
| 6,468,155 B1 | 10/2002 | Zucker et al. |
| 6,476,830 B1 | 11/2002 | Farmer et al. |
| 6,482,067 B1 | 11/2002 | Pickens |
| 6,493,001 B1 | 12/2002 | Takagi et al. |
| 6,494,762 B1 | 12/2002 | Bushmitch et al. |
| 6,519,771 B1 | 2/2003 | Zenith |
| 6,522,333 B1 | 2/2003 | Hatlelid et al. |
| 6,539,400 B1 | 3/2003 | Bloomfield et al. |
| 6,554,679 B1 | 4/2003 | Shackelford et al. |
| 6,559,863 B1 | 5/2003 | Megiddo |
| 6,560,511 B1 | 5/2003 | Yokoo et al. |
| 6,572,431 B1 | 6/2003 | Maa |
| 6,574,606 B1 | 6/2003 | Bell et al. |
| 6,587,834 B1 | 7/2003 | Dixon, III |
| 6,595,858 B1 | 7/2003 | Tajiri |
| 6,609,968 B1 | 8/2003 | Okada et al. |
| 6,612,501 B1 | 9/2003 | Woll et al. |
| 6,616,532 B2 | 9/2003 | Albrecht |
| 6,650,761 B1 | 11/2003 | Rodriguez et al. |
| 6,663,105 B1 | 12/2003 | Sullivan et al. |
| 6,685,565 B2 | 2/2004 | Tanibuchi et al. |
| 6,692,360 B2 | 2/2004 | Kusuda et al. |
| 6,704,784 B2 | 3/2004 | Matsuda et al. |
| 6,719,604 B2 | 4/2004 | Chan |
| 6,720,949 B1 | 4/2004 | Pryor et al. |
| 6,722,973 B2 | 4/2004 | Akaishi |
| 6,727,925 B1 | 4/2004 | Bourdelais |
| 6,729,884 B1 | 5/2004 | Kelton et al. |
| 6,734,884 B1 | 5/2004 | Berry |
| 6,734,885 B1 | 5/2004 | Matsuda |
| 6,735,324 B1 | 5/2004 | McKinley et al. |
| 6,739,941 B1 | 5/2004 | Brownsberger |
| 6,758,678 B2 | 7/2004 | Van Gilder |
| 6,772,195 B1 | 8/2004 | Hatlelid et al. |
| 6,773,325 B1 | 8/2004 | Mawle et al. |
| 6,773,344 B1 | 8/2004 | Gabai et al. |
| 6,800,013 B2 | 10/2004 | Liu |
| 6,813,605 B2 | 11/2004 | Nakamura |
| 6,814,662 B2 | 11/2004 | Sasaki et al. |
| 6,845,486 B2 | 1/2005 | Yamada et al. |
| 6,890,179 B2 | 5/2005 | Rogan et al. |
| 6,899,333 B2 | 5/2005 | Weisman |
| 6,910,186 B2 | 6/2005 | Kim |
| 6,918,833 B2 | 7/2005 | Emmerson |
| 6,944,421 B2 | 9/2005 | Axelrod |
| 6,951,516 B1 | 10/2005 | Eguchi et al. |
| 6,954,728 B1 | 10/2005 | Kusumoto et al. |
| 6,959,166 B1 | 10/2005 | Gabai et al. |
| 7,012,602 B2 | 3/2006 | Watson et al. |
| 7,037,166 B2 | 5/2006 | Shrock et al. |
| 7,039,940 B2 | 5/2006 | Weatherford |
| 7,042,440 B2 | 5/2006 | Pryor et al. |
| 7,046,242 B2 | 5/2006 | Kitsutaka |
| 7,054,831 B2 | 5/2006 | Koenig |
| 7,058,897 B2 | 6/2006 | Matsuda |
| 7,061,493 B1 | 6/2006 | Cook et al. |
| 7,062,722 B1 | 6/2006 | Carlin et al. |
| 7,066,781 B2 | 6/2006 | Weston |
| 7,076,445 B1 | 7/2006 | Cartwright |
| 7,081,033 B1 | 7/2006 | Mawle et al. |
| 7,086,005 B1 | 8/2006 | Matsuda |
| 7,089,083 B2 | 8/2006 | Yokoo et al. |
| 7,104,884 B2 | 9/2006 | Yokoi |
| 7,117,190 B2 | 10/2006 | Sabe et al. |
| 7,143,358 B1 | 11/2006 | Yuen |
| 7,155,680 B2 | 12/2006 | Akazawa et al. |
| 7,168,051 B2 | 1/2007 | Robinson et al. |
| 7,171,154 B2 | 1/2007 | Fujisawa |
| 7,179,171 B2 | 2/2007 | Forlines et al. |
| 7,181,690 B1 | 2/2007 | Leahy et al. |
| 7,191,220 B2 | 3/2007 | Ohwa |
| 7,208,669 B2 | 4/2007 | Wells et al. |
| 7,229,288 B2 | 6/2007 | Stuart et al. |
| 7,249,139 B2 | 7/2007 | Chuah et al. |
| 7,266,522 B2 | 9/2007 | Dutta et al. |
| 7,288,028 B2 | 10/2007 | Rodriquez et al. |
| 7,314,407 B1 | 1/2008 | Pearson |
| 7,425,169 B2 | 9/2008 | Ganz |
| 7,442,108 B2 | 10/2008 | Ganz |
| 7,448,231 B2 | 11/2008 | Jeanvoine et al. |
| 7,465,212 B2 | 12/2008 | Ganz |
| 7,478,047 B2 | 1/2009 | Loyall et al. |
| 7,488,231 B2 | 2/2009 | Weston |
| 7,534,157 B2 | 5/2009 | Ganz |
| 7,548,242 B1 | 6/2009 | Hughes et al. |
| 7,568,964 B2 | 8/2009 | Ganz |
| 7,599,802 B2 | 10/2009 | Harwood et al. |
| 7,604,525 B2 | 10/2009 | Ganz |
| 7,618,303 B2 | 11/2009 | Ganz |
| 7,677,948 B2 | 3/2010 | Ganz |
| 7,677,974 B2 | 3/2010 | Van Luchene |
| 7,690,997 B2 | 4/2010 | Van Luchene et al. |
| 7,789,726 B2 | 9/2010 | Ganz |
| 7,803,046 B2 | 9/2010 | Scott et al. |
| 7,789,758 B2 | 10/2010 | Van Luchene |
| 7,806,758 B2 | 10/2010 | Van Luchene |
| 7,819,731 B2 | 10/2010 | Suzuki |
| 7,850,527 B2 | 12/2010 | Barney et al. |
| 7,867,093 B2 | 1/2011 | Wright |
| 7,908,324 B2 | 3/2011 | Shochet et al. |

(56) References Cited

U.S. PATENT DOCUMENTS

| | | |
|---|---|---|
| 7,967,657 B2 | 6/2011 | Ganz |
| 7,970,663 B2 | 6/2011 | Ganz |
| 7,974,901 B2 | 7/2011 | Van Luchene |
| 7,974,902 B2 | 7/2011 | Van Luchene |
| 8,002,605 B2 | 8/2011 | Ganz |
| 8,241,099 B2 | 8/2012 | Blair et al. |
| 8,251,810 B2 | 8/2012 | Van Luchene |
| 8,262,471 B2 | 9/2012 | Van Luchene |
| 8,272,956 B2 | 9/2012 | Kelly et al. |
| 8,313,364 B2 | 11/2012 | Reynolds et al. |
| 8,328,611 B2 | 12/2012 | Sano et al. |
| 8,328,643 B1 | 12/2012 | Osvald et al. |
| 8,348,758 B2 | 1/2013 | Cram |
| 8,388,450 B1 | 3/2013 | McGuirk et al. |
| 8,460,052 B2 | 6/2013 | Ganz |
| 8,540,570 B2 | 9/2013 | Janis et al. |
| 8,636,558 B2 | 1/2014 | Eyzaguirre et al. |
| 8,641,471 B2 | 2/2014 | Ganz |
| 8,808,053 B2 | 8/2014 | Ganz |
| 8,900,030 B2 | 12/2014 | Ganz |
| 8,926,395 B2 | 1/2015 | Zheng |
| 9,132,344 B2 | 9/2015 | Borge |
| 9,199,175 B2 | 12/2015 | Zheng |
| 9,238,171 B2 | 1/2016 | Ganz |
| 9,610,513 B2 | 4/2017 | Ganz |
| 9,675,895 B2 | 6/2017 | Judkins et al. |
| 9,833,725 B2 | 12/2017 | Watry |
| 9,947,023 B2 | 4/2018 | Ganz |
| 2001/0020955 A1 | 9/2001 | Nakagawa |
| 2001/0031603 A1 | 10/2001 | Gabai et al. |
| 2001/0036851 A1 | 11/2001 | Saski et al. |
| 2001/0037304 A1 | 11/2001 | Paiz |
| 2001/0039206 A1 | 11/2001 | Peppel |
| 2002/0002514 A1 | 1/2002 | Kamachi et al. |
| 2002/0022523 A1 | 2/2002 | Dan et al. |
| 2002/0022992 A1 | 2/2002 | Miller et al. |
| 2002/0022993 A1 | 2/2002 | Miller et al. |
| 2002/0022994 A1 | 2/2002 | Miller et al. |
| 2002/0026357 A1 | 2/2002 | Miller et al. |
| 2002/0026358 A1 | 2/2002 | Miller et al. |
| 2002/0036617 A1 | 3/2002 | Pryor |
| 2002/0040327 A1 | 4/2002 | Owa |
| 2002/0054094 A1 | 5/2002 | Matsuda |
| 2002/0065746 A1 | 5/2002 | Lewis |
| 2002/0065890 A1 | 5/2002 | Barron |
| 2002/0068500 A1 | 6/2002 | Gabai et al. |
| 2002/0082065 A1 | 6/2002 | Fogel et al. |
| 2002/0082077 A1 | 6/2002 | Johnson et al. |
| 2002/0090985 A1 | 7/2002 | Tochner et al. |
| 2002/0094851 A1 | 7/2002 | Rheey |
| 2002/0111808 A1 | 8/2002 | Feinberg |
| 2002/0113809 A1 | 8/2002 | Akazawa et al. |
| 2002/0119810 A1 | 8/2002 | Takatsuka et al. |
| 2002/0130894 A1 | 9/2002 | Young |
| 2002/0147640 A1 | 10/2002 | Daniele |
| 2002/0160835 A1 | 10/2002 | Fujioka et al. |
| 2002/0161666 A1 | 10/2002 | Fraki et al. |
| 2002/0168919 A1 | 11/2002 | Perkins |
| 2002/0169668 A1 | 11/2002 | Bank et al. |
| 2002/0169672 A1 | 11/2002 | Barnhart |
| 2002/0183119 A1 | 12/2002 | Fessler |
| 2002/0198781 A1 | 12/2002 | Cobley |
| 2002/0198940 A1 | 12/2002 | Bower et al. |
| 2003/0004889 A1 | 1/2003 | Fiala |
| 2003/0018523 A1 | 1/2003 | Rappaport |
| 2003/0034955 A1 | 2/2003 | Gilder |
| 2003/0045203 A1 | 3/2003 | Sabe et al. |
| 2003/0055984 A1 | 3/2003 | Shimakawa et al. |
| 2003/0061161 A1 | 3/2003 | Black |
| 2003/0088467 A1 | 5/2003 | Culver |
| 2003/0093182 A1 | 5/2003 | Yokoyama |
| 2003/0119570 A1 | 6/2003 | Maroun |
| 2003/0126031 A1 | 7/2003 | Asami |
| 2003/0166414 A1 | 9/2003 | Sako et al. |
| 2003/0220885 A1 | 11/2003 | Lucarelli |
| 2003/0222902 A1 | 12/2003 | Chupin et al. |
| 2003/0232649 A1 | 12/2003 | Gizis |
| 2003/0236119 A1 | 12/2003 | Forlines et al. |
| 2004/0009812 A1 | 1/2004 | Scott et al. |
| 2004/0030595 A1 | 2/2004 | Park et al. |
| 2004/0043806 A1 | 3/2004 | Kirby |
| 2004/0046736 A1 | 3/2004 | Pryor et al. |
| 2004/0053690 A1 | 3/2004 | Fogel et al. |
| 2004/0075677 A1 | 4/2004 | Loyall et al. |
| 2004/0092311 A1 | 5/2004 | Weston |
| 2004/0093266 A1 | 5/2004 | Dohring |
| 2004/0153557 A1 | 8/2004 | Shochet et al. |
| 2004/0189702 A1 | 9/2004 | Hlavac et al. |
| 2004/0193489 A1 | 9/2004 | Boyd et al. |
| 2004/0204127 A1 | 10/2004 | Forlines et al. |
| 2004/0219961 A1 | 11/2004 | Ellenby et al. |
| 2004/0229696 A1 | 11/2004 | Beck |
| 2004/0242326 A1 | 12/2004 | Fujisawa |
| 2004/0259465 A1 | 12/2004 | Wright et al. |
| 2005/0043076 A1 | 2/2005 | Lin |
| 2005/0049725 A1 | 3/2005 | Huang |
| 2005/0059483 A1 | 3/2005 | Borge |
| 2005/0071225 A1 | 3/2005 | Bortolin |
| 2005/0114272 A1 | 5/2005 | Herrmann et al. |
| 2005/0137015 A1 | 6/2005 | Rogers et al. |
| 2005/0192864 A1 | 9/2005 | Ganz |
| 2005/0243091 A1 | 11/2005 | Hong |
| 2005/0250415 A1 | 11/2005 | Barthold |
| 2005/0250416 A1 | 11/2005 | Barthold |
| 2005/0272504 A1 | 12/2005 | Eguchi et al. |
| 2005/0287925 A1 | 12/2005 | Proch et al. |
| 2006/0035692 A1 | 2/2006 | Kirby |
| 2006/0079150 A1 | 4/2006 | Filoseta et al. |
| 2006/0080539 A1 | 4/2006 | Asami et al. |
| 2006/0093142 A1 | 5/2006 | Schneier et al. |
| 2006/0166593 A1 | 7/2006 | Shrock et al. |
| 2006/0285441 A1 | 12/2006 | Walker et al. |
| 2007/0050716 A1 | 3/2007 | Leahy et al. |
| 2007/0111795 A1 | 5/2007 | Choi et al. |
| 2007/0143679 A1 | 6/2007 | Resner |
| 2007/0176363 A1 | 8/2007 | Bielman |
| 2008/0009350 A1 | 1/2008 | Ganz |
| 2008/0009351 A1 | 1/2008 | Ganz |
| 2008/0045285 A1 | 2/2008 | Fujito |
| 2008/0081694 A1* | 4/2008 | Hong ............... A63F 13/02 463/34 |
| 2008/0109313 A1 | 5/2008 | Ganz |
| 2008/0109392 A1 | 5/2008 | Nandy |
| 2008/0134099 A1 | 6/2008 | Ganz |
| 2008/0155019 A1* | 6/2008 | Wallace ............ A63F 13/71 709/204 |
| 2008/0163055 A1 | 7/2008 | Ganz |
| 2008/0274806 A1 | 11/2008 | Ganz et al. |
| 2008/0274811 A1 | 11/2008 | Ganz et al. |
| 2009/0029772 A1 | 1/2009 | Ganz |
| 2009/0053970 A1* | 2/2009 | Borge ............... A63H 13/02 446/268 |
| 2009/0054155 A1 | 2/2009 | Borge |
| 2009/0063282 A1 | 3/2009 | Ganz |
| 2009/0131164 A1* | 5/2009 | Ganz ............... A63H 3/36 463/29 |
| 2009/0149233 A1 | 6/2009 | Strause et al. |
| 2009/0204420 A1 | 8/2009 | Ganz |
| 2010/0151940 A1 | 6/2010 | Borge |
| 2011/0009190 A1 | 1/2011 | Scott et al. |
| 2011/0039622 A1 | 2/2011 | Levenson |
| 2011/0039623 A1 | 2/2011 | Levenson |
| 2011/0256937 A1 | 10/2011 | Van Luchene |
| 2011/0263322 A1 | 10/2011 | Van Luchene |
| 2012/0238361 A1 | 9/2012 | Janis et al. |
| 2012/0238362 A1 | 9/2012 | Janis et al. |
| 2012/0264520 A1 | 10/2012 | Marsland et al. |
| 2013/0079143 A1 | 3/2013 | McGuirk et al. |
| 2013/0079145 A1 | 3/2013 | Lam et al. |
| 2013/0088491 A1 | 4/2013 | Hobbs et al. |
| 2013/0102379 A1 | 4/2013 | Sargent et al. |
| 2013/0109474 A1 | 5/2013 | Login et al. |
| 2013/0109479 A1 | 5/2013 | Ganz |

(56) References Cited

U.S. PATENT DOCUMENTS

| | | | |
|---|---|---|---|
| 2014/0273717 A1* | 9/2014 | Judkins | A63H 3/006 446/175 |
| 2015/0065258 A1 | 3/2015 | Meade | |
| 2016/0236085 A1* | 8/2016 | Yano | A63F 13/217 |
| 2016/0325180 A1* | 11/2016 | Nelson | A63F 13/355 |
| 2017/0221305 A1* | 8/2017 | Peterson | G07F 17/3248 |
| 2021/0125212 A1 | 4/2021 | Ganz et al. | |

FOREIGN PATENT DOCUMENTS

| | | | |
|---|---|---|---|
| EP | 0 971 302 A1 | 1/2000 | |
| EP | 1 228 792 A1 | 8/2002 | |
| GB | 2365364 A | 2/2002 | |
| JP | 2000-57373 A | 2/2000 | |
| JP | 2001-222585 A | 8/2001 | |
| JP | 2001222585 A | 8/2001 | |
| JP | 2001-283024 A | 10/2001 | |
| JP | 2001-321571 A | 11/2001 | |
| JP | 2002-016171 A | 1/2002 | |
| JP | 2002063092 A | 2/2002 | |
| JP | 2002-297498 A | 10/2002 | |
| JP | 2003-016035 A | 1/2003 | |
| JP | 2002-134481 A | 7/2003 | |
| JP | 2003-205178 A | 7/2003 | |
| JP | 2003-210843 A | 7/2003 | |
| JP | 2003-242058 A | 8/2003 | |
| JP | 2003-248650 A | 9/2003 | |
| KR | 20010073524 A | 8/2001 | |
| WO | 99/42917 A2 | 8/1999 | |
| WO | 9950733 A2 | 10/1999 | |
| WO | 00/33533 A1 | 6/2000 | |
| WO | 2001004852 A1 | 1/2001 | |
| WO | 01/69572 A1 | 9/2001 | |
| WO | 01/69829 A2 | 9/2001 | |
| WO | 01/69830 A2 | 9/2001 | |
| WO | 01/90841 A2 | 11/2001 | |
| WO | 02/22224 A1 | 3/2002 | |
| WO | 2002021407 A1 | 3/2002 | |
| WO | 02/27591 A1 | 4/2002 | |
| WO | 02/054327 A1 | 7/2002 | |
| WO | 2002079925 A2 | 10/2002 | |
| WO | 02/099581 A2 | 12/2002 | |
| WO | 03/026764 A2 | 4/2003 | |
| WO | 03/034303 A1 | 4/2003 | |
| WO | 2003071389 A2 | 8/2003 | |
| WO | 2005/064502 A1 | 7/2005 | |

OTHER PUBLICATIONS

Amendment and Response to Office action for Inter Partes Reexamination of U.S. Pat. No. 7,604,525, dated Oct. 19, 2010.
Action Closing Prosecution of Inter Partes Reexamination of U.S. Pat. No. 7,677,948—dated Sep. 14, 2010.
Action Closing Prosecution of Inter Partes Reexamination of U.S. Pat. No. 7,568,964—dated Sep. 8, 2010.
Action Closing Prosecution for Inter Partes Reexamination of U.S. Pat. No. 7,604,525, dated Feb. 25, 2011.
3rd Party Comments re: Response to Office action for Inter Partes Reexamination of U.S. Pat. No. 7,604,525, dated Nov. 2, 2010.
"The Sims," http://en.wikipedia.org/wiki/, retrieved Feb. 6, 2010.
"The Sims Booklet," dated 2000.
"The Sims 10th Anniversary," http://thesims2.ea.com/, dated Feb. 26, 2010.
"Look Out Pokemon," The Ottawa Citizen, Dated Feb. 7, 2000.
Search Report—CA2696620—dated Mar. 1, 2011.
Reexamination Request No. 95/001,343—NTC of Intent to Issue Reexam Certificate dated Feb. 27, 2013.
Reexamination Request No. 95/001,422—Board Decision Feb. 13, 2013.
Reexamination Request No. 95/001,422—Patent Owner's Response After Closing Prosecution. Cert of Service dated Mar. 13, 2013.
Reexamination Request No. 95/001,345—Order Remanding Inter Partes Reexamination to the Examiner Mar. 19, 2013.
Right of Appeal notice for Inter Partes Reexamination of U.S. Pat. No. 7,604,525 dated Nov. 14, 2011.
Examiners Answer for Inter Partes Reexamination of U.S. Pat. No. 7,568,964 dated Nov. 15, 2011.
Action Closing Prosecution for Inter Partes Reexamination of U.S. Pat. No. 7,618,303 dated Nov. 14, 2011.
Decision on Appeal of Reexamination Request No. 95/001,341, dated Oct. 30, 2012.
Request to Reopen Prosecution of Reexamination Request No. 95/001,341, dated Nov. 30, 2012.
Decision on Appeal of Reexamination Request No. 95/001,343, dated Oct. 30, 2012.
Order Denying Request Reopen of Reexamination Request No. 95/001,345, dated Nov. 7, 2012.
Renewed Request Reopen of Reexamination Request No. 95/001,345, dated Nov. 21, 2012.
Rebuttal Brief of 3rd Party of Reexamination Request No. 95/001,422, dated Sep. 13, 2012.
Rebuttal Brief Entered of Reexamination Request No. 95/001,422, dated Nov. 15, 2012.
Appeal Docketing Notice of Reexamination Request No. 95/001,422, dated Nov. 26, 2012.
Inter Parties Reexamination Certificate for 95/001,343 issued Apr. 24, 2013.
Examiner's Determination for 95/001,345 dated May 1, 2013.
Reexamination Request No. 95/001,422—Final Board Decision issued Jun. 4, 2013.
Petition for the Director to Review the Denial of Reexamination Request No. 90/011,310, dated Jan. 6, 2011.
Status Inquiry on Petition for the Director to Review the Denial of Reexamination Request No. 90/011,310, dated Jan. 13, 2012.
Denial of Petition for the Director to Review the Denial of Reexamination Request No. 90/011,310, dated Jan. 26, 2012.
Examiner's Answer of Reexamination Request No. 95/001,341, dated Apr. 12, 2012.
Rebuttal Brief of 3rd Party Requestor of Reexamination Request No. 95/001,341, dated May 10, 2012.
Appellant's Brief of Reexamination Request No. 95/001,343, dated Feb. 14, 2012.
Respondent's Brief of Reexamination Request No. 95/001,343, dated Mar. 8, 2012.
Examiner's Answer of Reexamination Request No. 95/001,343, dated Apr. 25, 2012.
Rebuttal Brief of 3rd Party Requestor of Reexamination Request No. 95/001,345, dated Dec. 14, 2011.
BPAI Docketing Notice of Reexamination Request No. 95/001,345, dated Apr. 9, 2012.
Rebuttal Brief Entry of Reexamination Request No. 95/001,345, dated Mar. 27, 2012.
Right of Appeal Notice of Reexamination Request No. 95/001,422, dated Apr. 2, 2012.
Notice of Appeal by 3rd Party Requestor of Reexamination Request No. 95/001,422, dated Apr. 17, 2012.
Rebuttal Brief of Patent Owner of Reexamination Request No. 95/001,343, dated May 25, 2012.
Decision on Appeal of Reexamination Request No. 95/001,345, dated Jun. 12, 2012.
Extension of Time Petition of Reexamination Request No. 95/001,345, dated Jul. 2, 2012.
Decision on Petition of Reexamination Request No. 95/001,345, dated Jul. 12, 2012.
Request to Reopen Prosecution of Reexamination Request No. 95/001,345, dated Jul. 12, 2012.
Third Party Requestor's Reply to Request of Reexamination Request No. 95/001,345, dated Aug. 9, 2012.
Examiner's Answer of Reexamination Request No. 95/001,422, dated Aug. 15, 2012.
U.S. Appl. No. 16/871,304 to Ganz, filed May 11, 2020.
Reexamination 95/011,341—Decision on Reconsideration—Denied; Dated Apr. 21, 2015.
Reexamination 95/011,341—Notice of Appeal to Federal Circuit; Dated Jun. 22, 2015.

(56) References Cited

OTHER PUBLICATIONS

Reexamination 95/011,341—Examiner's Determination, dated Oct. 18, 2013.
Reexamination 95/011,341—Response After Decision, dated Nov. 18, 2013.
Reexamination 95/011,341—Declaration of Karl Borst, Nov. 18, 2013.
Reexamination 95/001,345—PTAB Docketing Notice, Dec. 23, 2013.
Reexamination 95/001,345—Notice of Concurrent Proceedings, Dec. 30, 2013.
Reexam Certificate Issued for 95/001,422, dated Oct. 30, 2013.
BPAI Decision on Appeal 11840939, dated Jan. 24, 2014.
BPAI Decision on Appeal 11840940, dated Jan. 24, 2014.
BPAI Decision on Appeal 11859491, dated Jan. 24, 2014.
BPAI Decision on Appeal 11840941, dated Jan. 29, 2014.
Reexamination 95/011,341—PTAB Docketing Notice, Jan. 31, 2014.
Reexamination 95/011,341—PTAB Decision, Apr. 1, 2014.
Reexamination 95/001,345—PTAB Decision, Apr. 1, 2014.
Request for Rehearing 11840939, dated Mar. 24, 2014.
Request for Rehearing 11840940, dated Mar. 24, 2014.
Request for Rehearing 11859491, dated Mar. 24, 2014.
Request for Rehearing 11840941, dated Mar. 29, 2014.
Reexamination 95/011,341—Request for Rehearing, May 1, 2014.
Request for Rehearing—Denied 11840939, dated May 9, 2014.
Request for Rehearing—Denied 11840940, dated May 9, 2014.
Request for Rehearing—Denied 11859491, dated May 9, 2014.
Request for Rehearing—Denied 11840941, dated May 9, 2014.
Notice of Appeal 11840939, dated May 7, 2012.
Notice of Appeal 11840940, dated Apr. 30, 2012.
Notice of Appeal 11840941, dated Apr. 30, 2012.
Notice of Appeal 11859491, dated Apr. 30, 2012.
Reexamination 95/011,345—Reexam Certificate Issued; Dated Sep. 16, 2014.
Reexamination 95/001,422—NTC of Intent to Issue a Reexam Certificate, dated Sep. 30, 2013.
Reexamination 95/001,341—Order Remanding Reexam to Examiner for Consideration, dated Jul. 31, 2013.
Reexamination 95/011,341—Appellant's Motion to Dismiss Appeal; Dated Aug. 18, 2015.
Reexamination 95/011,341—Order Granting Motion to Dismiss; Dated Sep. 3, 2015.
https://bratzboulevard.wordpress.com/tag/app/ accessed on Sep. 19, 2019.
https://furby.hasbro.com/en-us/apps accessed on Sep. 16, 2019.
https://apps.apple.com/us/app/action-heroez/id680915120 accessed on Sep. 19, 2019.
Search Report—AU-2009202831, dated Jan. 12, 2011.
Search Report—AU-2009202829, dated Jan. 4, 2011.
Search Report—AU-2009202828, dated Jan. 13, 2011.
USPTO Communication Form for Ex Partes Reexamination of U.S. Pat. No. 7,568,964 dated Nov. 12, 2010.
U.S. Copyright Registrations for The Sims expansion packs, Dec. 31, 2000.
The Sims: News, "Details about Makin Magic," Jul. 11, 2003.
The Neopian Times, Week 42 retrieved Mar. 25, 2010.
The Neopian Times, Week 32 retrieved Mar. 25, 2010.
The Helpful Neopian retrieved Mar. 25, 2010.
Telecomworldwire, "Product Sidewire," Oct. 1995.
Second Request for Reexamination of U.S. Pat. No. 7,618,303—with Exhibits B, C, D, E, F, L, M dated Aug. 24, 2010.
Search Report—CA2665737, dated Oct. 26, 2010.
Search Report for PCT/CA2004/002206 dated May 2, 2005.
Right of Appeal notice for Inter Partes Reexamination of U.S. Pat. No. 7,677,948 dated Jan. 18, 2011.
Right of Appeal notice for Inter Partes Reexamination of U.S. Pat. No. 7,568,964 dated Jan. 15, 2011.
Request for Reexamination of U.S. Pat. No. 7,677,948—with Exhibits B, C, D, E, O, P, Q, R, S, and T dated Apr. 20, 2010.
Request for Reexamination of U.S. Pat. No. 7,618,303—with Exhibits B, C, D, E, M, N, and O dated Apr. 20, 2010.
Request for Reexamination of U.S. Pat. No. 7,604,525—with Exhibits H, I, J, K, L, X, and Y dated Apr. 20, 2010.
Request for Reexamination of U.S. Pat. No. 7,568,964—with Exhibits B, C, N, O, R, S dated Apr. 20, 2010.
Request for ExParte Reexamination of U.S. Pat. No. 7,568,964—no exhibits dated Nov. 1, 2010.
Prima's Official Strategy Guide—The Sims, dated 2000.
Pojo's Unofficial Guide to Neopets, 2003.
Petition to Review Denial for Ex Partes Reexamination of U.S. Pat. No. 7,568,964 dated Jan. 6, 2011.
PC Magazine, "The Sims Online Arrives," dated Dec. 18, 2002.
Order Granting Request for Inter Partes Reexamination of U.S. Pat. No. 7,677,948 dated Jul. 9, 2010.
Order Granting Request for Inter Partes Reexamination of U.S. Pat. No. 7,618,303 Nov. 8, 2010.
Order Granting Request for Inter Partes Reexamination of U.S. Pat. No. 7,604,525 dated Jul. 9, 2010.
Order Granting Request for Inter Partes Reexamination of U.S. Pat. No. 7,568,964 dated Jul. 10, 2010.
Order Denying Ex Partes Reexamination of U.S. Pat. No. 7,568,964 dated Dec. 10, 2010.
Office action for Inter Partes Reexamination of U.S. Pat. No. 7,618,303—dated Dec. 17, 2010.
Office action for Inter Partes Reexamination of U.S. Pat. No. 7,604,525—dated Aug. 19, 2010.
Notice of Termination of Inter Partes Reexamination of U.S. Pat. No. 7,618,303, dated Sep. 30, 2010.
Notice of Appeal in Inter Partes Reexamination of of U.S. Pat. No. 7,677,948 dated Feb. 17, 2011.
Notice of Appeal in Inter Partes Reexamination of of U.S. Pat. No. 7,568,964 dated Feb. 10, 2011.
Nothing But Neopets, "Neopian History.", retrieved Mar. 24, 2010.
Nothing But Neopets, "Dec. 2002."
Neopian Hospital, retrieved Mar. 24, 2010.
Neopets-Archeology, retrieved Mar. 25, 2010.
Neopets The Official Magazine, dated Nov. 18, 2003.
Neopet Nation, Mar. 13, 2003.
monopets.com, registration, Dec. 12, 2002.
Monopets, "The Gurgle," plush toy, undated, (photographs taken Aug. 2007).
M2 Presswire, "UltraCorps—second premium title for the Internet Gaming Zone Oblivion," May 1998.
Johnson, "Sympathetic Interfaces," 1999.
Japanese Patent Office, Decision of Refusal, JP App No. 2006-545875, dated Feb. 18, 2009.
Intl Search Report—PCT-CA2009-000271 dated Sep. 7, 2010.
http://www.lego.com, Feb. 6, 2003, www.archive.org.
http://web.archive.org.web.20031202190119/www.monopets.com/, Dec. 2, 2003.
Grace, "Web site tycoon's next goal: sixth grade", dated Jun. 19, 2002.
Decision Vacating Inter Partes Reexamination of U.S. Pat. No. 7,618,303, dated Jun. 30, 2010.
Office action CA-3096193, dated Oct. 22, 2021.

* cited by examiner

LIVE TOY SYSTEM

BACKGROUND

Virtual world websites have been a popular gaming and activity outlet for all ages. With a simple user account, users can enter imaginary worlds online and interact with the site content as well as other users through their online characters.

Ganz, the assignee of the present application, has numerous patents that took the online virtual world a step further, when it first introduced a plush toy having a unique code and a related virtual online world in which the toy's code is entered in order to obtain a virtual version of the toy in the virtual world. Once the plush toy was registered online in this manner, the user was able to play with their virtual toy in the virtual world. Ganz's patents describe how the user could decorate a home for the toy, play games and earn items such as food, clothes and home furnishings for the toy.

SUMMARY

Described herein is a live toy system and method that affords a user with an experience of interacting with a physical toy as if it were a live toy by communicating and interacting with the physical toy and its game avatar via a game application. The system provides a near identical representation of the physical toy in the game application. The game application provides a virtual world in a game-based environment in which the game avatar exists and participates in game activities in part by input received from the user. Some of this input comes from the user via the physical toy. The physical toy can receive input from the user and then transmit that input data or some responsive data to the game avatar in the game application using a Bluetooth® or similar connection between the physical toy and a computing device running the game application. Therefore, the user can affect the appearance or behavior of the game avatar by way of the physical toy. The user can play and interact with both their physical toy in the real world and its game avatar in an online world—which provides an experience of a single live toy for the user.

The live toy system can include a physical toy comprising a master control unit, an input component for receiving incoming data, a communications control component for managing, handling and transmitting data, and an output component comprising a speaker, wherein the master control unit controls the input component, the communications control component and the output component by processing data associated with each component, managing requests and processing and tracking queued requests; a server computer that is connected to at least one computing device and that is programmed to create signals which are communicated to cause the display to be generated on the at least one computing device as a game application, wherein the display shows a virtual world in which a replica image of the physical toy exists in the virtual world as a game avatar; wherein the physical toy is registered to a user account via a unique code in the game application on the at least one computing device, the physical toy and the game avatar are connected to each other via the computing device and the game application, and the physical toy and the game avatar each create requests and communicate the requests to each other, where upon the physical toy's completion of a request sent by the game avatar, the game avatar receives data corresponding to the completion from the physical toy and outputs a reaction on the display of the game application, where upon the game avatar's completion of a request sent by the physical toy, the physical toy receives data from the computing device corresponding to the completion which triggers an output event from the output component, wherein the physical toy and the game avatar collectively represent one toy that exists in the virtual world and in a real world at the same time and where physical interaction with the physical toy directly affects the game avatar in the virtual world and playing with the game avatar in the game application results in responsive reactions in the physical toy.

Also, a method is described that includes providing a physical toy having an input component for receiving incoming data and a communications control component for managing, handling data and transmitting data, and an output component comprising a speaker; providing at least one computing device that is wirelessly connected to the physical toy and comprises a display; and using a server computer that is connected to at least one computing device and that is programmed to create signals which are communicated to cause a display to be generated on the computing device as a game application, wherein the display shows a virtual world in which a replica image of the physical toy exists in the virtual world as a game avatar; wherein the physical toy is registered to a user account via a unique code in the game application on the at least one computing device, the physical toy and the game avatar are connected to each other via the computing device and the game application, and the physical toy and the game avatar each create requests and communicate the requests to each other for completion, where upon the physical toy's completion of a request sent by the game avatar, the game avatar receives data corresponding to the completion from the physical toy and outputs a reaction on the display of the game application, where upon the game avatar's completion of a request sent by the physical toy, the physical toy receives data from the computing device corresponding to the completion which triggers an output event from the output component, wherein the physical toy and the game avatar represent a character that exists in the virtual world and in a real world at the same time and where physical interaction with the physical toy affects the game avatar in the virtual world and playing with the game avatar generates responses in the physical toy.

Another method is described that includes using a server computer that is communicating with multiple computing devices and that is programmed to create signals which are communicated to cause a display to be generated on a computing device as a game application, wherein the display creates a virtual world in which a replica image of a physical toy that exists in a real world also exists in the virtual world as a game avatar; using the server computer to assign the physical toy to an account in the game application via a unique validation code for the physical toy, which causes the game avatar to be displayed in the game application; wherein the server computer sends data to and receives data from the physical toy via a wireless communication between the physical toy and the computing device and causes the game application to be updated according to the data received from the physical toy; and wherein the server computer causes the game avatar to be responsive to the physical toy in the virtual world by exchanging data communications with the physical toy in the real world and in real time when the computing device is paired with the physical toy and the game application is open, and further whereby the game avatar creates requests and communicates them to the physical toy, and the server computer receives and processes data corresponding to sensor input from the physical toy and the game application is updated as a result of the sensor input from the physical toy.

DETAILED DESCRIPTION

The live toy system as described herein affords a user with an experience of interacting with a physical toy as if it were a live toy by communicating with the toy via an online software or game application. Unlike other products, the system provides a near identical or virtual representation of the physical toy in the online application. The online application provides a virtual world and/or game environment in which the virtual toy exists as a game avatar and participates in part by input received from the user. Some of this input is provided to the physical toy from the user who can affect the appearance or behavior of the game avatar in the online application. The physical toy and game avatar come together as one to form a single character. As will be described in more detail below, the user is able to play and interact with both their physical toy and an identical looking electronic version of their physical toy in an online world—the game avatar, where the game avatar and the physical toy together create an experience of a single character or live toy for the user.

Figure 1:
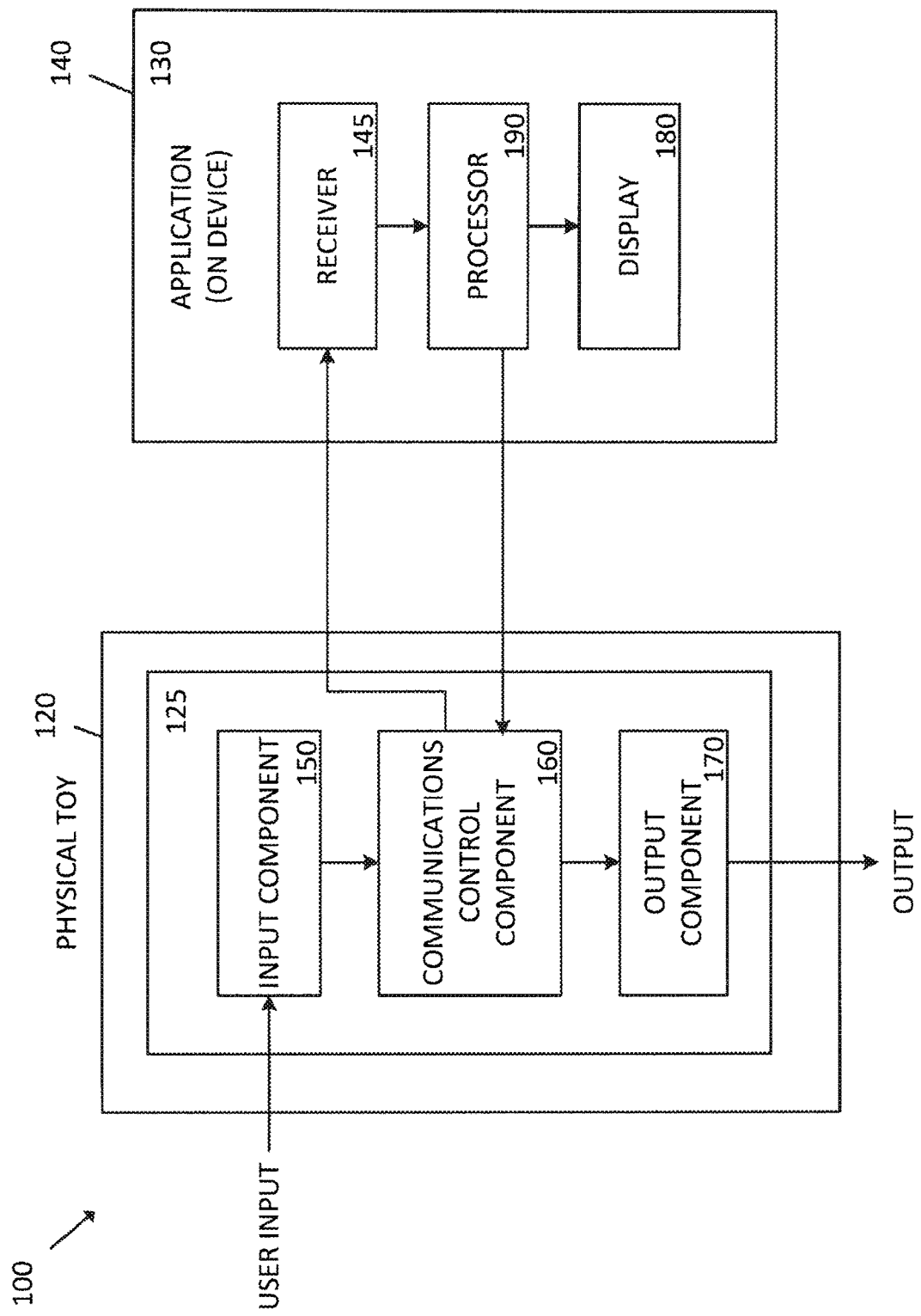
FIG. 1 is a block diagram of a live toy system as described herein that facilitates a user's interaction with a physical or real toy and an online application to effectuate a live-acting physical toy.

According to FIG. 1, a block diagram of a live toy system 100 is shown which facilitates two-way communication as part of a game world. The game world via an App or application interacts with a physical toy, and the physical toy can interact with the App as well, and in particular with a game version of itself.

The system 100 comprises a physical toy or physical toy object 120 and a game application (App) 130 that is located on a separate or remote computing device 140. Examples of the physical toy or physical toy object 120 include plush or plastic toy objects. Examples of a mobile or remote device 140 include a smart phone or tablet or any other type of computing device such as a laptop or computer.

The physical toy 120 exists in the game application as a game avatar having an appearance that is based on and recognizable as the physical toy; however, the game avatar can have more clothes and accessories to wear, can be fed, can perform activities in the virtual game world. The App 130 operates on a computing device which is paired with the toy. When paired, the physical toy and the game avatar communicate and interact with each other via the App 130. This creates a more fulfilling play experience because the player/user can interact with the physical toy through the game avatar and by doing so, the physical toy and the game avatar come together resulting in a live toy.

The physical toy 120 comprises a master control unit 125, an input component 150, a communications control component 160 and an output component 170. The master control unit 125 controls the input component, the communications control component and the output component. In one embodiment, the input component 150 can include a microphone to pick up sounds such as the user's voice. It can also include one or more sensors that are programmed to detect touch, sound, or external temperature such as room temperature. The output component can include a speaker and/or a display screen.

The communications control component 160 in the physical toy 120 manages and processes incoming and outgoing data from the physical toy. This includes incoming and outgoing data to and from a player/user and to and from the paired application 130. The data passed between the physical toy 120 and the paired application 130 may be characterized as requests. A request sent from one side may warrant some kind of task to be completed by the other side—for example, if the request was sent from the game avatar in the paired application to the physical toy, then the physical toy may need to complete the task in order to yield or elicit some other reaction or result in the application 130. The opposite would apply as well. If the request is sent from the physical toy to the game avatar in the paired application, then the game avatar in the paired application may need to complete a task (via the user playing the game).

The communications control component 160 includes a processor in order to analyze data and handle it properly. As alluded to above, data can be transmitted via wireless communication protocols such as Bluetooth®. The physical toy 120 and the game application 130 on the computing device 140 can be connected via Bluetooth® so that user input from the physical toy 120 can be readily transmitted in a proper format and received by the computing device 140 via a receiver 145. For example, a user may touch the physical toy 120 and the touch is detected by at least one sensor embedded in the physical toy 120. The touch data is processed and transmitted to the user's account in the paired application 130. The paired application 130 processes the data via a processor 190 and the result can be displayed on the computing device screen (display 180). The result can also be communicated back to the physical toy 120 and then provided as output from the physical toy such as in the form of sounds or words through a speaker (output component 170) built into the physical toy 120.

Figure 2:
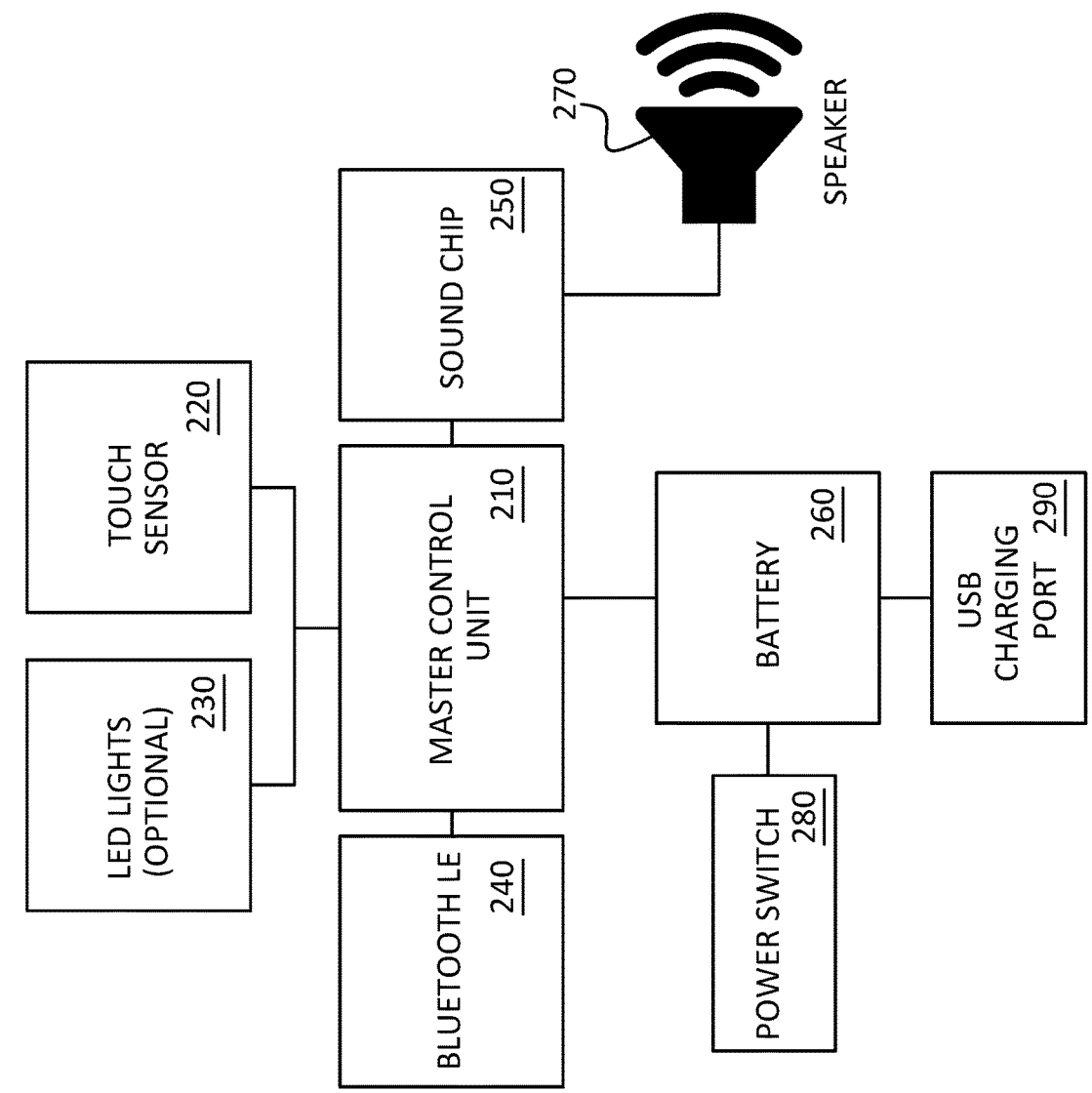
FIG. 2 is a block diagram of various features built into a physical toy which can be used in the live toy system as discussed in FIG. 1.
Figure 2:
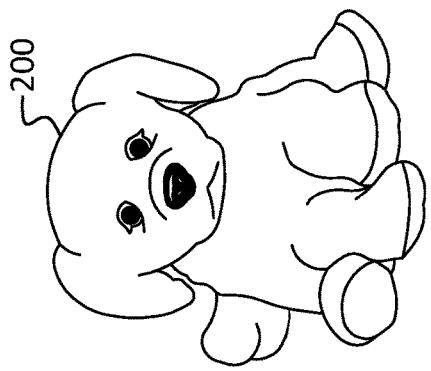

Referring now to FIG. 2, there is an exemplary image of a physical toy 200 that can be used in the live toy system 100 as discussed in FIG. 1. The physical toy 200 resembles a plush toy or stuffed animal; however, it should be appreciated that any type of toy including figurines or other objects can be used in the live toy system 100 operate as described herein. The physical toy 200 can be made of any material such as textiles, ceramic, silicon and/or plastic or any combination thereof.

Also in FIG. 2 is a master control unit 210 that comprises one or more processors or microprocessors which manage or regulate at least one touch sensor 220 and optional LED light(s) 230, Bluetooth® LE 240, a sound chip or microprocessor 250, and a battery 260. The master control unit manages requests made bi-directionally between the physical toy and the App 130. The sound chip 250 is connected to a speaker 270 with optional volume control built into the toy 200, and the battery 260 is connected to a power switch 280 and a USB charging port 290. In addition, the one or more touch sensors 220 can be positioned anywhere on the toy such as the head, back and/or paws to allow direct communication between the physical toy and the App/game avatar.

The master control unit 210 also includes Flash RAM for storing physical toy data, a request queue and a unique identifier so that the App 130 syncs with the selected physical toy. The sound chip 250 includes sound RAM/ROM for storing multiple sampled sound effects that can be triggered by the physical toy 120 or by the App 130.

The Bluetooth® communication allows for bi-directional communication between the physical toy 120 and the App 130 running on the computing device 140. The physical toy also has a button to pair with Bluetooth® on the device 140. The pairing button can be the same or a different button as the power on/off button. Alternatively, the pairing can be carried out in software without a button.

The physical toy 120 can be paired with any Bluetooth-enabled device. Once paired, the toy 120 can automatically connect to the device whenever it is in range. The physical toy 120 has three primary modes: unpaired, paired but App closed, and paired with App open.

When the App 130 is open and the physical toy 120 is paired to the device, the App 130 will recognize that the physical toy 120 is paired. In one embodiment, if the App 130 is open and the physical toy is paired to the device, but the player has not activated the physical toy—that is, no data is sent from the toy 120 to the App 130, then the App 130 can ask if the player wants to play with the physical toy 120.

If the player has multiple physical toys assigned to the user account, then the App 130 can ask if the player would like to switch to a different physical toy 120. If the App 130 is closed and then later opened, the App 130 can be programmed to open with the most recently played physical toy as the active toy in the App 130.

While the App 130 is open and the physical toy is paired, the system will send commands to the active physical toy to trigger an output event such as sounds in the physical toy—for example, when any of the following events occur:
 A toy request is initiated
 A toy request is completed
 A game is won
 A game is lost
 The game avatar is fed
 The game avatar's outfit is changed
 The game avatar is put to bed (optional)
 Sounds on the physical toy include:
 Awake—a neutral sound that can used when the pet becomes active and/or for generic requests
 Happy—3-5 variations
 Sad—2-3 variations
 Eating—2-3 variations
 Hungry—used for feeding requests
 Playful—used for game requests Other events may also occur to trigger an output event in the physical toy in the form of a sound representing various emotions/reactions. Other sounds aside from those listed are contemplated as well. Additionally, while paired and the App 130 is open, more specific sounds, such as sleeping, can be streamed directly from the App 130 to the physical toy's speaker. Optionally, if the active physical toy has sensors, the App 130 will recognize when the sensors are being touched/used or otherwise activated. The App 130 and the game character can be responsive to the data received from the sensors.

The App 130 can also use sensors in the physical toy as inputs to a game. In one embodiment, the game avatar in the App 130 may want some attention by saying "I'm feeling down. Can I have a hug?". The App 130 transmits this as a request to the physical toy 120 and the sensors embedded in the physical toy 120 detect touch data corresponding to a hug. That touch data is communicated back to the App 130, and the game avatar may respond such as by giving a reward, points and/or providing some other type of response (e.g., a visual or audible response). In another embodiment, the physical toy can say or express "I'm getting hungry. Can I have a snack?". This request is communicated to the App 130, where the player can feed the game avatar. Once fed, the App 130 communicates that the request is completed to the physical toy and the physical toy may respond with an appropriate sound.

The App 130 can send the game avatar's current Happiness/Hunger/Energy stats to the physical toy on the one minute "heartbeat" to be stored in the toy's Flash RAM.

When playing with the paired physical toy with either the App closed or otherwise not communicating, the master control unit 210 determines when it will make a request to the App. The request is selected from the options available in the Flash RAM's Request Queue. The physical toy 200 can play a request sound based on the type of request selected. The master control unit 210 stores the request in request queue until the App is opened or begins to communicate with the physical toy 200.

As stated earlier, if the active (paired) physical toy is not the active game avatar in the App when the App is opened, the App will automatically switch to the correct game avatar in the App. The unique identifier in the active physical toy is communicated to the App and the corresponding game avatar in the App account is put into play. The corresponding game avatar in the App is a nearly, if not completely, identical image of the physical toy to create the effect of the physical toy 200 having an in-game or in-App existence. The physical toy can tell the App which request from the queue it wants to trigger. If the request is ignored, after a brief amount of time such as 3 minutes (the length of a request), that request will be removed from the request queue in the physical toy. If there are no requests available in the queue, no request will be made by the toy.

The App 130 can also send one or more game avatar requests to the physical toy's Flash RAM to be used as a "queue" of requests that can be accessed while the App is not open. If the physical toy is not paired with the device, then interactive play between the physical toy and the game avatar in the App is not available. However, the physical toy can be played with and appropriate input data collected by its sensors can be processed and stored and then later transmitted to the App when the physical toy is paired with the App. In addition, or in the alternative, if the physical toy has sensors, the sensors can directly trigger sounds in the toy when petted, hugged, etc. The master control unit can also recognize that the physical toy is not being used and occasionally make either sad sounds or other alerting sounds that simply encourage kids to hug/pet the toy. Optionally, the same functionality for paired physical toy with App closed can be available while the physical toy is not paired. The physical toy will simply wait for both the Bluetooth connection to be made AND the App to be opened.

Regarding power use, to avoid battery drainage, the physical toy has multiple power saving features. For example, the physical toy can be manually shut off such as by holding the pair/power button down for 5 seconds. There is also a method for automatically shutting down the physical toy or can go into "sleep" mode when the toy is not actively played with, and/or is not paired with the App when the App is open and available for pairing, for a designated amount of time—such as 5 minutes, for instance.

Figure 3:
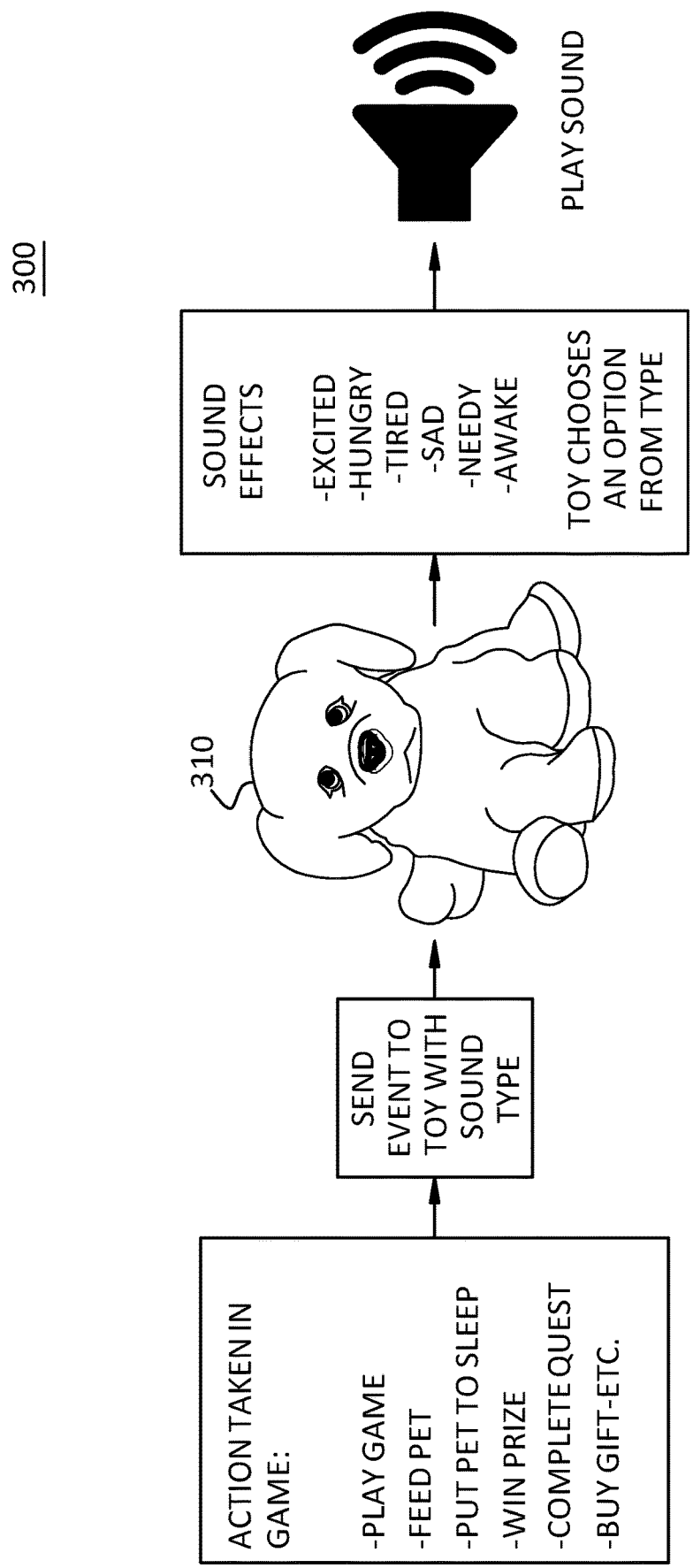
FIG. 3 is an exemplary schematic diagram of the live toy system of FIG. 1 as it would operate for a player/user.

Turning now to FIG. 3, there is a schematic flow diagram 300 illustrating a live toy system in operation such as the system 100 discussed in FIG. 1. According to the diagram 300, a physical toy 310 is connected via Bluetooth® technology to an App located on a mobile computing device. The App is a game where a player has set up an account and has registered a code associated with the physical toy 310 in the account. In the game App, the registered physical toy appears virtually identical in the game—referred to as the game avatar herein. The game avatar is a character in the game App that the player interacts with, in part, via playing the game or playing activities in the game and in part, via the physical toy. In the game App, the player can perform various actions such as, but not limited to, playing the game or various activities in the game, feeding the game avatar, putting the game avatar to bed or to sleep, winning prizes for the game avatar, completing quests or challenges to benefit the game avatar or overall position in the game, buying gifts or other items available for purchase in the game App and the like. Information or data concerning any one of these events can be communicated to the paired physical toy. The master control unit processes the data and chooses a sound effect that is pre-determined as an appropriate response to such data and then the sound chip plays a sound which can be heard by the player/user via the physical toy's built-in speaker. For example, there could be sound effects assigned as part of a table for various reactions or feelings providing separate sound effects for different emotions or states such as excited, hungry, tired, sad, needy, awake, or confused. The physical toy expresses or acts out the feeling or reaction that the game avatar elicits, bringing it to life for the player/user.

Figure 4:
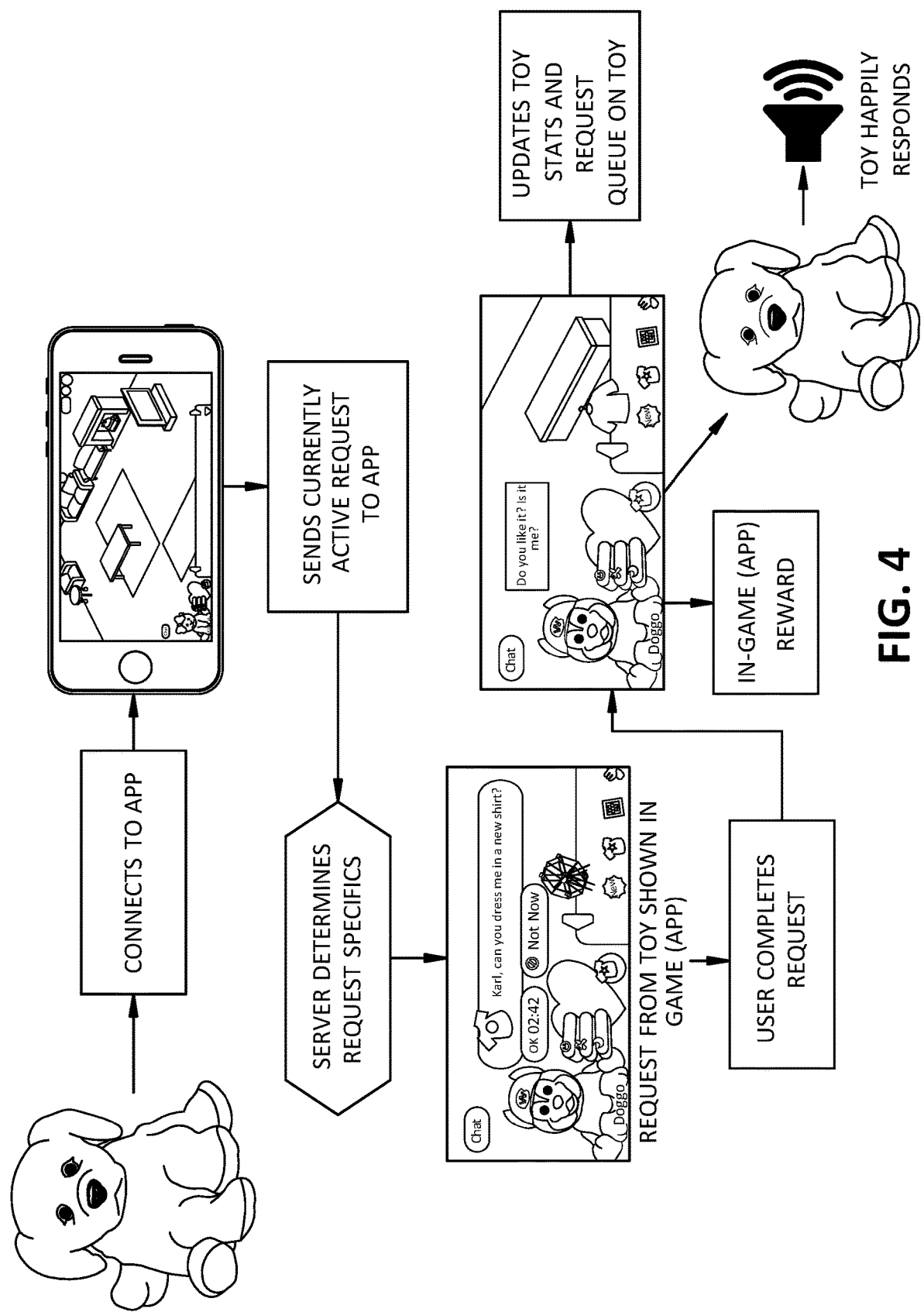
FIG. 4 is an exemplary schematic diagram of the live toy system of FIG. 1 as it would operate for a player/user.

In FIG. 4, there is shown an exemplary schematic 400 of the live toy system 100 in operation. A physical toy 410 connects to an open App via Bluetooth® and sends a request to the App. A server supporting the App processes the request to determine the specific details of the request and displays the request on-screen of the App—such as "Karl, can you dress me in a new shirt?" This request is from the physical toy to the App and, specifically to the game avatar in the App. The App displays two options for the player to choose from—Ok or Not now. The player/user completes the request by choosing "Ok" and the screen then displays "Do you like it? Is it me?" and an in-game reward is added to the account for completing the request. In response to the on-screen questions, the physical toy outputs a happy or excited sound from its speaker. Multiple sounds may be triggered to exhibit "happy" or "excited" or any other feeling/mood.

The App also updates the game avatar account to reflect the reward and a mood indicator as well as any other game avatar stats there may be—such as hunger status, bored status, energy level, or social level (whether the game avatar wants to engage in social play with other active players or with other physical toys that may be paired to the same account in the App). In addition, the request queue is also updated to show that a request was completed and/or any content associated with it. In practice, for instance, an account in the App may include multiple game avatars, with each of the game avatars corresponding to a different physical toy. A dashboard view, for instance, can show the current status of each game avatar registered to the user's account.

If a user has multiple physical toys and corresponding game avatars registered in the App, it is also possible for those multiple game avatars (registered to the same user account) to interact with each other. The physical toys would be triggered from the respective game avatars as described above in the figures.

The App may also support interaction or game play between more than one user. In one embodiment, multiple game avatars registered to different user accounts can participate in activities or play games in the App. Different users and their respective accounts can be linked or otherwise connected via the App and their respective game avatars can interact with each other in the App. The corresponding physical toys would be triggered by their respective game avatars from the App as described in the figures. In another embodiment, a first user can use his/her game avatar to send a request to a second user's game avatar in the App. The request is then communicated from the second user's game avatar to the second user's physical toy. The physical toy completes the request via the second user; and that completed request (or response data) is communicated back to the second user's game avatar. The response data is then communicated to the first user's game avatar and then to the first user's physical toy.

As a further example, there could be requirements for the different game avatars to satisfy before they can play with each other. For instance, if at least two physical toys are paired to the App and both corresponding game avatars have high enough social levels or other status indicators that indicate they want to play or be played with, at least one of them may express that the two game avatars want to interact with each other. This can be expressed on screen in the App and then also communicated into one or more requests made from the App to the physical toy and the physical toy may play some sounds in order to grab the attention of the player/user and obtain a response from the player/user.

Figure 5:
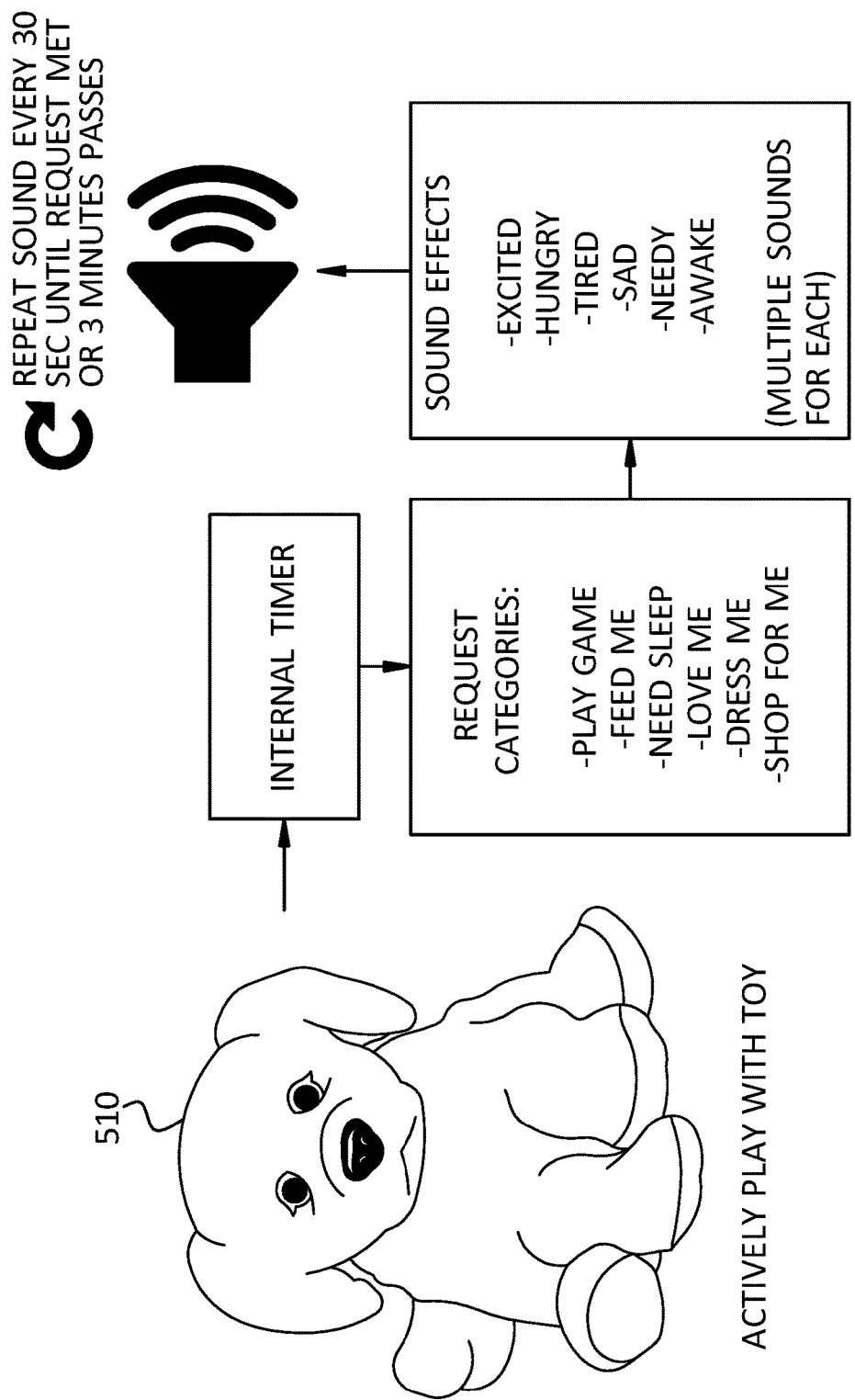
FIG. 5 is an exemplary schematic flow diagram that represents an operation of the physical toy in the live toy system of FIG. 1.

Now referring to FIG. 5, another exemplary schematic flow diagram is shown to represent an operation of the physical toy 510. A user can play with the physical toy 510 via the App and the physical toy 510 can also include an internal timer. The internal timer can track if a response is received in response to a request made in the App. The request may be one from various categories that would be satisfied in the App such as play game (in App), feed me, need sleep, love me, dress me, bathe me, shop for me, and the like. With each request or each category of request, the physical toy can output one or more sound effects that are appropriate for the type of request made. The sound effects may be repeated such as every 30 seconds until the request is acknowledged or satisfied or until some other amount of time threshold is satisfied—such as when 3 minutes has elapsed since the request was made (logged) without a response to the request. A threshold time can be programmed to determine an "ignored" request. If the response is deemed to be ignored, then an ignore counter can increase by one and the internal timer can be reset. When the ignore counter reaches 5 ignores or some other determined number of ignores, the physical toy may be silenced or put to sleep until the physical toy is paired with the App again. By silencing the physical toy or putting the physical toy to sleep, battery power is conserved.

What is claimed is:

1. A live toy system comprising:
  a physical toy comprising a master control unit, an input component for receiving incoming data, a communications control component for managing, handling and transmitting data, and an output component comprising a speaker, wherein the master control unit controls the input component, the communications control component and the output component by processing data associated with each component, managing requests and processing and tracking queued requests;

a server computer that is connected to at least one computing device and that is programmed to create signals which are communicated to cause the display to be generated on the at least one computing device as a game application, wherein the display shows a virtual world in which a replica image of the physical toy exists in the virtual world as a game avatar;

wherein the physical toy is registered to a user account via a unique code in the game application on the at least one computing device, the physical toy and the game avatar are connected to each other via the computing device and the game application, and the physical toy and the game avatar each create requests and communicate the requests to each other, where upon the physical toy's completion of a request sent by the game avatar, the game avatar receives data corresponding to the completion from the physical toy and outputs a reaction on the display of the game application, where upon the game avatar's completion of a request sent by the physical toy, the physical toy receives data from the computing device corresponding to the completion which triggers an output event from the output component, wherein the physical toy and the game avatar collectively represent one toy that exists in the virtual world and in a real world at the same time and where physical interaction with the physical toy directly affects the game avatar in the virtual world and playing with the game avatar in the game application results in responsive reactions in the physical toy.

2. The system of claim 1, wherein the physical toy is a made of a plush or plastic material.

3. The system of claim 1, wherein the master control unit manages battery power and usage of the physical toy.

4. The system of claim 1, wherein the physical toy further comprises a wireless device, which transmits data between the physical toy and the game avatar when paired with the computing device and when the game application is open.

5. The system of claim 4, wherein the physical toy automatically pairs with the computing device when the game application is open, and a wireless connection is enabled on both the physical toy and the computing device.

6. The system of claim 1, wherein the physical toy further comprises at least one of a touch sensor, a microphone, a sound sensor, storage memory LED lights, a sound chip, a speaker, a battery, charging port and a power switch.

7. The system of claim 1, wherein the game application is associated with a user account and the physical toy is associated with the user account and the physical toy is specified in the user account as the game avatar.

8. The system of claim 1, wherein the physical toy further comprises an internal timer that counts a number of requests sent to a physical toy from the game avatar and determines how many requests within a prescribed amount of time have been ignored and if a threshold number is satisfied, then the physical toy is signaled to switch to a reduced power mode.

9. The system of claim 1, wherein multiple physical toys along with their corresponding game avatars, which are associated with different user accounts, are connected to the game application and are permitted to interact with each other by way of the game application.

10. The system of claim 1, wherein there is a first user associated with the user account, and a second user is associated with a second user account, and wherein the server computer controls the first user using their game avatar to send a first request to the second user's game avatar, and the first request is communicated from the second user's game avatar to the second user's physical toy; and responsive to the second user's physical toy completing the first request, information indicative of the first request having been finished is communicated from the second user's game avatar, to the first user's game avatar and then is transmitted to the first user's physical toy.

11. A method comprising:

providing a physical toy having an input component for receiving incoming data and a communications control component for managing, handling data and transmitting data, and an output component comprising a speaker;

providing at least one computing device that is wirelessly connected to the physical toy and comprises a display; and using a server computer that is connected to at least one computing device and that is programmed to create signals which are communicated to cause a display to be generated on the computing device as a game application, wherein the display shows a virtual world in which a replica image of the physical toy exists in the virtual world as a game avatar;

wherein the physical toy is registered to a user account via a unique code in the game application on the at least one computing device, the physical toy and the game avatar are connected to each other via the computing device and the game application, and the physical toy and the game avatar each create requests and communicate the requests to each other for completion, where upon the physical toy's completion of a request sent by the game avatar, the game avatar receives data corresponding to the completion from the physical toy and outputs a reaction on the display of the game application, where upon the game avatar's completion of a request sent by the physical toy, the physical toy receives data from the computing device corresponding to the completion which triggers an output event from the output component, wherein the physical toy and the game avatar represent a character that exists in the virtual world and in a real world at the same time and where physical interaction with the physical toy affects the game avatar in the virtual world and playing with the game avatar generates responses in the physical toy.

12. The method of claim 11 further comprising pairing the physical toy and the computing device via a wireless connection, and when paired and the game application is open, the game avatar corresponding to a paired physical toy is chosen for play in the game application.

13. The method of claim 12 further comprising sending a request from the game application to the physical toy when the game application has not detected activity or other data received from the physical toy within a prescribed amount of time.

14. The method of claim 13, wherein the request comprises a task to be completed and when completed, data is communicated to a source of the request to generate at least one of a visual or audible response by the source of the request following completion of the task.

15. The method of claim 11 further comprising detecting touch input from one or more touch sensors in the physical toy and transmitting data associated with the input to the game application via the computing device.

16. The method of claim 11 further comprises storing requests made by the game application to the physical toy in a request queue when the physical toy is not paired with the computing device and processing the requests in order when the physical toy is paired and the game application is open.

17. The method of claim 11, wherein there is a first user associated with the user account, and there is a second user associated with a second user account, and where the method further comprises:
   using the game avatar of the first user, the first user sends a first request to the second user's game avatar;
   communicating the first request from the second user's game avatar to the second user's physical toy; and
   responsive to the second user's physical toy completing the request, information indicative of the second request having been finished is communicated from the second user's game avatar, to the first user's game avatar and then to the first user's physical toy.

18. The method of claim 11 further comprises linking the physical toy to the game application via a unique code assigned to the physical toy, where upon a successful link, the game avatar image which substantially replicates the physical toy is displayed in the game application.

19. The method of claim 11, wherein multiple game avatars and corresponding physical toys associated with different user accounts are connected to the game application and are permitted to interact with each other by way of the game application.

20. A method comprising:
   using a server computer that is communicating with multiple computing devices and that is programmed to create signals which are communicated to cause a display to be generated on a computing device as a game application, wherein the display creates a virtual world in which a replica image of a physical toy that exists in a real world also exists in the virtual world as a game avatar;
   using the server computer to assign the physical toy to an account in the game application via a unique validation code for the physical toy, which causes the game avatar to be displayed in the game application;
   wherein the server computer sends data to and receives data from the physical toy via a wireless communication between the physical toy and the computing device and causes the game application to be updated according to the data received from the physical toy; and
   wherein the server computer causes the game avatar to be responsive to the physical toy in the virtual world by exchanging data communications with the physical toy in the real world and in real time when the computing device is paired with the physical toy and the game application is open, and further whereby the game avatar creates requests and communicates them to the physical toy, and the server computer receives and processes data corresponding to sensor input from the physical toy and the game application is updated as a result of the sensor input from the physical toy; and
   wherein the server computer causes request reminders to be displayed in the game application and the server computer also pings the physical toy with request reminders when the physical toy is paired with the computing device and the game application is open.

21. The method of claim 20, wherein the request comprises a task to be completed and when completed, data is communicated to a source of the request to generate a visual or audible response from the source of the request following completion of the task.

22. The method of claim 20, wherein the server computer tracks requests sent to the physical toy in a queue in the game application until data is received from the physical toy in response to each request.

* * * * *